No. 759,782. PATENTED MAY 10, 1904.
L. J. & L. U. WARD.
WEEDER AND CULTIVATOR.
APPLICATION FILED JULY 22, 1903.
NO MODEL. 2 SHEETS—SHEET 1.

No. 759,782. PATENTED MAY 10, 1904.
L. J. & L. U. WARD.
WEEDER AND CULTIVATOR.
APPLICATION FILED JULY 22, 1903.
NO MODEL. 2 SHEETS—SHEET 2.

Witnesses
Charles Morgan,

Inventors
L. J. WARD. L. U. WARD.
By
Attorneys

No. 759,782.	Patented May 10, 1904.

UNITED STATES PATENT OFFICE.

LOUIS J. WARD AND LOWELL U. WARD, OF OLEX, OREGON.

WEEDER AND CULTIVATOR.

SPECIFICATION forming part of Letters Patent No. 759,782, dated May 10, 1904.

Application filed July 22, 1903. Serial No. 166,598. (No model.)

*To all whom it may concern:*

Be it known that we, LOUIS J. WARD and LOWELL U. WARD, citizens of the United States, residing at Olex, in the county of Gilliam, State of Oregon, have invented certain new and useful Improvements in Weeders and Cultivators; and we do hereby declare the following to be a full, clear, and exact description of the invention, such as will enable others skilled in the art to which it appertains to make and use the same.

This invention relates to farm implements, and more particularly to the class of weeders and cultivators, the object of the invention being to provide an implement which will have the effect of cutting through and pressing under the weeds and similar trash encountered without liability of clogging the implement, while the soil will be pulverized and worked in a manner to insure the best results.

A further object of the invention is to provide a construction wherein there will be no side draft due to uneven working of the soil and in which the disks may be adjusted to vary the pressure thereof against the earth to suit different specific conditions.

Figure 1:
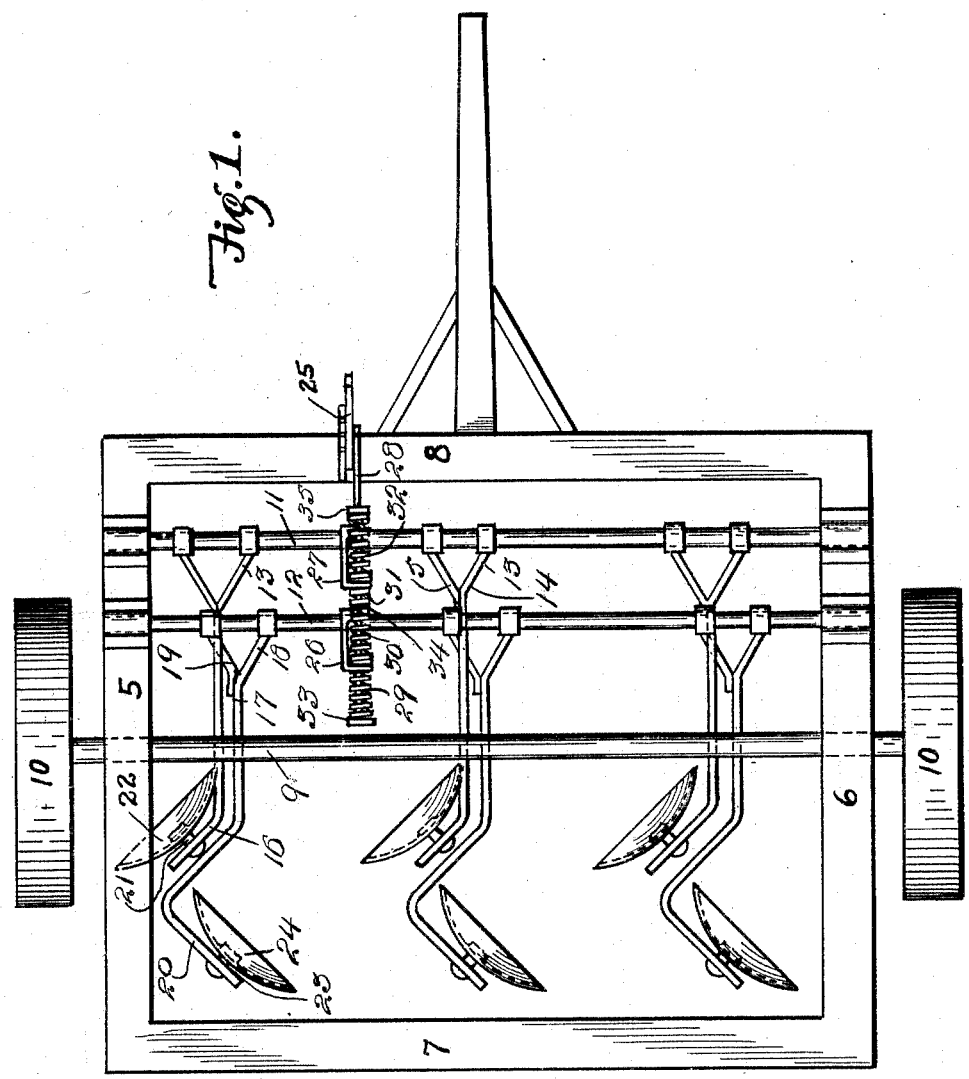
Figure 2:
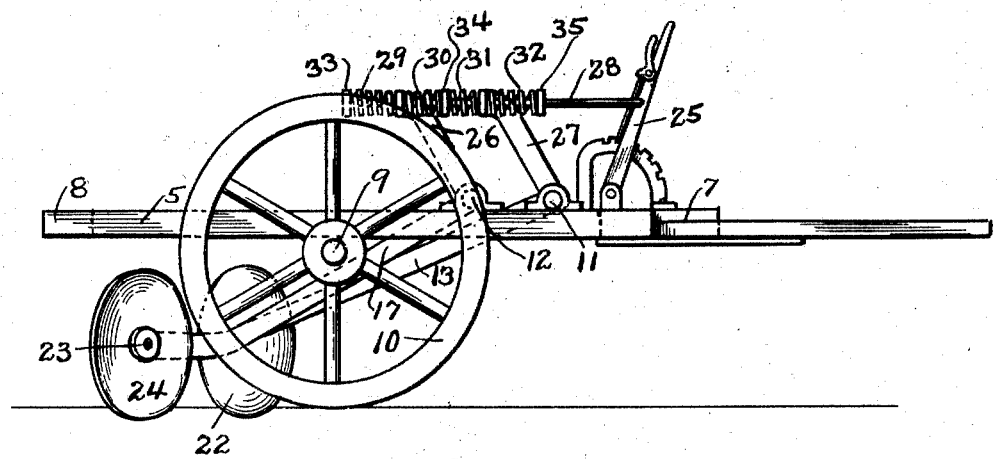
Figure 3:
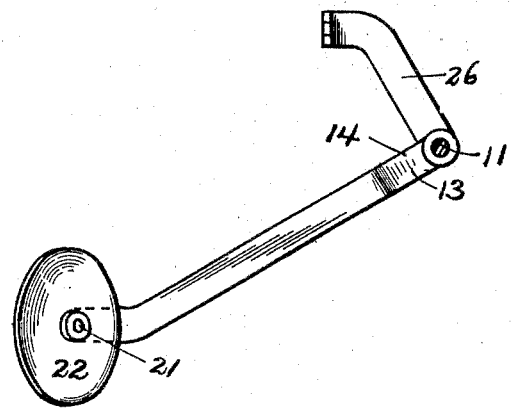

In the drawings forming a portion of this specification, and in which like numerals of reference indicate similar parts in the several views, Figure 1 is a top plan view of an implement embodying the present invention. Fig. 2 is a side elevation of the implement. Fig. 3 is a detail view of one of the spring-arms with its disk.

Referring now to the drawings, the present implement comprises a frame including the side or longitudinal sills 5 and 6, connected at their front and rear ends, respectively, by the cross-beams 7 and 8. Transversely of the frame is arranged an axle 9, and upon this axle are the supporting-wheels 10 of the implement.

Upon the frame of the implement are mounted the parallel shafts 11 and 12, which extend throughout the width of the implement-frame and which carry the earth-treating tools. To the front shaft 11 are attached a series of arms 13, the front ends of which are bent laterally, as shown at 14, and secured to the shaft 11, and attached to these arms at the angles of their lateral bends are braces 15, which are attached also to the shaft 11 and hold the arms securely at their forward ends. From the points of attachment of the braces 15 the arms 13 are continued rearwardly and straight for some distance, and the rear or free end portions of the arms are curved laterally in the direction shown at 16, the several arms of the series being parallel at corresponding portions throughout their lengths.

Attached to the shaft 12 are the arms 17 of a second series, the forward end portions 18 of these arms being turned laterally in the same direction as the portions 14 of the arms 13 and attached to the shaft 12, there being braces 19 attached to the arms 17 and the shaft 12 and corresponding to the braces 15. The arms 17 extend rearwardly and parallel with the arms 13 throughout the lengths of the arms in the rear of the points of attachment of the braces 18, and beyond the laterally-curved end portions 16 of the arms 13 the arms 17 are curved in the opposite direction, as shown at 20. Each of the portions 16 of the arms 13 has a stub-shaft 21, on which is mounted a cutting-disk 22, which is held at an angle to the direction of advance of the implement, the disk being at the concaved side of the arm. The rear end portion 20 of each arm 17 has a stub-shaft 23, on which is mounted a disk 24. The disks are concaved or dished, and the peripheral portions of the rear disks 24 overlap the disks 22. The disks are arranged at right angles to each other, as shown, so that in the progress of the implement the disks may enter the ground and finely divide the lumps, so as to produce a well-worked surface.

Upon the frame of the machine is mounted a lever 25, and the shafts 11 and 12 have upwardly-directed arms 26 and 27. The arms 26 and 27 are perforated, and through them is passed a rod 28, which is connected to the lever 25. Upon the rod 28 are helical springs 29 and 30, which bear against opposite faces of the arms 26, and other helical springs, 31 and 32, which bear against opposite faces of the arms 27, the opposite ends of the several springs being disposed against the nuts 33, 34, and 35 upon the rod. With this arrangement when the lever 25 is swung in one direction the rods 11 and 12 are rotated to carry the disks downwardly into the soil, and when the shaft is moved in the opposite direction the disks are lifted from the soil, the presence of the springs serving to hold the disks yieldably in either their upper or lower positions. With this arrangement of disks it will be noted that as the implement advances the lateral pressure of the forward series of disks against the ground is equalized by pressure in the opposite direction from the other series of disks, so that lateral movement or side draft of the implement does not occur.

In practice modifications of the specific construction shown may be made, and any suitable materials and proportions may be used for the various parts without departing from the spirit of the invention.

What is claimed is—

1. A farm implement comprising a frame, two transverse series of arms mounted at their forward ends in the frame and having their rear ends bent laterally, the rear ends of the arms of one series extending rearwardly beyond those of the other series and bent in a direction parallel to that of the ends of the other series of arms and again in a direction opposite to that of the said other series, said second bends lying in the plane of the forward portion of the first-named arms and a disk rotatably mounted on the concaved side of the rear end portion of each arm, the disks of one series overlapping the disks of the other series.

2. A farm implement comprising a wheeled frame, two shafts rotatably mounted in the frame, one in advance of the other, and having each an upwardly-directed arm, a series of arms attached to each shaft and extending rearwardly and downwardly therefrom, the rear ends of the arms of one series extending beyond those of the other series and the rear ends of the arms of both series being bent laterally, a concaved disk rotatably mounted on the concaved face of the rear end portion of each of the arms with the disks of the arms of one series overlapping those of the other series and standing at right angles thereto, a lever mounted upon the frame of the implement, and connections between the lever and the shafts for rocking the latter and the disks therewith.

In testimony whereof we affix our signatures in presence of two witnesses.

LOUIS J. WARD.
    LOWELL U. WARD.

Witnesses:
 W. L. TOBEY,
 F. L. TOBEY.